United States Patent

Rinsch et al.

[11] Patent Number: 5,818,335
[45] Date of Patent: Oct. 6, 1998

[54] PROPERTY PROTECTION METHOD RELATING TO WATERCRAFT

[75] Inventors: Hartmut Rinsch, Erikastrasse 113, 20251 Hamburg; Torsten Pannen, Rosengarten, both of Germany

[73] Assignee: Hartmut Rinsch, Germany

[21] Appl. No.: 628,671

[22] PCT Filed: Jul. 10, 1994

[86] PCT No.: PCT/EP94/03318

§ 371 Date: Aug. 21, 1996

§ 102(e) Date: Aug. 21, 1996

[87] PCT Pub. No.: WO95/10433

PCT Pub. Date: Apr. 20, 1995

[30] Foreign Application Priority Data

Oct. 11, 1993 [DE] Germany .......................... 43 34 601.4

[51] Int. Cl.$^6$ ................................ G08B 1/08; H04Q 7/00
[52] U.S. Cl. .................... 340/539; 340/932.2; 340/984; 340/825.54; 340/825.31; 340/725.34
[58] Field of Search ..................................... 340/539, 566, 340/932.2, 984, 825.54, 825.69, 825.72, 825.31, 825.32, 825.27

[56] References Cited

U.S. PATENT DOCUMENTS 4,477,809 10/1984 Bose .................................. 340/825.54
5,373,282 12/1994 Carter ...................................... 340/539
5,432,515 7/1995 O'Conner ............................... 340/984

FOREIGN PATENT DOCUMENTS 2587664 3/1987 France .
2593306 7/1987 France .

*Primary Examiner*—Donnie L. Crosland
*Attorney, Agent, or Firm*—Cesari and McKenna, LLP

[57] ABSTRACT

A process is disclosed for protecting watercraft against theft in an area delimited in space, for example a harbor, using a stationary transmitting/receiving unit and an on-board transmitting/receiving unit. When interrogated by the stationary unit, the on-board unit emits a characteristic identification signal. The identification signal contains a basic key that identifies the watercraft and the identification signals of all watercraft in the harbor are stored in a central computer. To legitimize use of the watercraft, a legitimization key is input into a central computer before departure. The central computer ascertains whether the use of the watercraft is legitimate based on the interrogation carried out by the stationary transmitting/receiving unit and, if required, triggers an alarm and information program.

5 Claims, 2 Drawing Sheets

PROPERTY PROTECTION METHOD RELATING TO WATERCRAFT

The invention concerns a process to protect the ownership of watercraft.

BACKGROUND OF THE INVENTION

The term "watercraft" is understood here to include particularly, but not exclusively, sailboats, power gliders or motor yachts, wherein a "spatially limited area," is for example a harbor with an entrance and an exit, for example a marina. The stationary transmitting/receiving unit (called a "T/R unit" below) belonging to the marina can be positioned, for example, on one of the pier heads bordering the harbor entrance and exit, and the electromagnetic sector emitted by the stationary T/R unit can be directed at the opposite pier head, wherein everything entering the harbor must pass through this electromagnetic sector. The term "protect ownership" here is taken to mean protect said watercraft from unauthorized use.

The unauthorized use of sailboats, power gliders and motor yachts without the authorization of the boat owner, as well as total loss of the watercraft due to organized theft, represent a major, increasing problem for boat owners. The long absence of the boat owner, the inability of very large marinas to oversee and forced anonymity favor unauthorized use of sailboats and motor yachts, which are increasingly being "borrowed" or stolen, without the owner's knowledge. Unauthorized use is only discovered when the owner discovers the loss of his yacht on site. Yachts illegally borrowed are frequently found after use at another site where anonymity in turn ensures that discovery of illegal use takes a very long time. Investigations into the perpetrators are usually not very successful due to the time factor, since there are frequently several weeks between the time the yacht was stolen and when the theft was discovered. Organized thieves thus have enough time to repaint and refit the boat and thus neutralize it.

To deal with this problem, the known automobile alarm systems are also used for sailboats and motor yachts. But the problem here is that the yachts are frequently not used for weeks, and most of the time the boat owner lives not near the marina, but far away from it. If the yacht is broken into, the alarm system goes off, and the perpetrators take off. Since the boat owner is most often not directly involved with the alarm and other people—if present at all—generally don't bother much with such alarms, these known alarm systems are not very effective. Moreover, these alarm systems have a relatively high false-alarm rate, which can disturb the peace in the marina. This sometimes forces the boat owner to turn off the alarm system.

FR-A-2-587-664 describes a device to protect ownership of watercraft that are in a spatially limited area, with a stationary T/R unit and a T/R unit onboard the craft, and with a stationary photoelectric cell and Doppler radar, which trigger the stationary T/R unit to send out a query signal. The watercarft receives an identification signal, but no additional code, so no "branding" of a stolen craft is possible, and no identification of illegal use when it sails into a foreign harbor or on the high seas.

FR-A-2-593-306 describes a process to protect the ownership of watercraft which is very similar to the process in FR-2-587-664. But this known process goes one step further, since the response signal beamed out by the watercraft consists of a basic code and an additional code (authorization code). In any case, in these known processes, there is no retransmission of a "branded" code, so illegally used craft cannot be identified when they sail into a foreign harbor or on the high seas.

SUMMARY OF THE INVENTION

The task of this invention is to specify a process to protect the ownership of watercraft, especially sailing yachts and motor yachts, that is active only when they sail out of a marina without authorization and that informs the owner or a hired organization immediately and effectively of illegal use.

This task is solved by a process to protect the ownership of watercraft with the features in the main claim.

With the process of the invention, incoming and outgoing watercraft equipped with the T/R unit of the invention are monitored by means of a stationary T/R unit on the pier head, as are watercraft equipped in this way on the high seas by query from a mobile T/R unit by the coast guard. In both cases, the T/R unit on the craft is only active if the search signal from the querying T/R unit is received, since the craft's own T/R unit beams an identification signal with a basic code identifying the craft and an additional code identifying legal or illegal use of the craft. In the case of a stationary T/R unit, its central computer checks whether there is an authorization to sail out for this basic code or whether the basic code is reported as stolen. It the latter is true, or if there is no authorization to sail out, an alarm and information program is triggered, which informs a monitoring organization or the boat owner directly (for example by fax) of unauthorized use of the craft. Furthermore, when the stationary T/R unit receives a code known to the central computer, it sends it back with an additional code to the T/R unit on the craft, wherein the additional code sent back corresponds to a predetermined value, for example "0," if the craft or its code were preauthorized to sail out by inputting the corresponding code in the central computer, while the additional code sent back by the central computer is set at a value "X," if there is no authorization. Thus the additional code is changed or set at "0" by the stationary T/R unit only when the protected craft sails out with authorization, and at "X," when it sails out with no authorization. Thus the departing protected craft receives a "stamp" invisible to the boat driver, which makes the boat identifiable as being used with or without authorization. This additional code set by the stationary T/R unit when sailing out is read when the boat sails into another harbor protected with the process in the invention by the stationary T/R unit there as it passes through the electromagnetic sector, and the central computer there triggers the alarm and information program when the additional code is "X," that it deviates from the predetermined value "0."

Advantageous variations of the invention are specified in the subclaims.

To protect the process from tampering, provision is preferably made for the additional code to be changed only in the central computer of the stationary T/R unit. Provision is also made for the central computer to compare the basic code received with the basic codes stored and to trigger the alarm and information program if the additional code received or stored does not contain the predetermined value. Here, a comparison of the basic code received with the basic codes stored in the central computer is used to determine whether the craft is sailing in or out. If the basic code received is known by the central computer, then it is a craft sailing out, since the basic codes of all protected crafts lying within the limited area are stored in the central computer. If the basic code received is not known by the central computer, it automatically recognizes a craft sailing in. The additional code received is relevant to the central computer in deciding whether the alarm or information program should be triggered, if the craft is sailing in, whereas the additional code stored in the central computer is relevant if the code received is known to the central computer, and it is thus a protected craft sailing out.

If a watercraft protected by the process of the invention is sailing into a protected harbor, provision is preferably made that when the stationary central computer receives an identification signal with an unknown code and with an additional code set at the predetermined value "0," it stores the code until the craft sails out. Thus, at any time, this ensures that all watercraft in the protected harbor that are protected by the process in the invention have their basic codes stored in the central computer.

Another advantageous embodiment of the ownership protection process provides for the spatially limited area to be delimited by a directional electromagnetic sector, which is produced by at least one stationary T/R unit. This can, as already mentioned above, be on a pier head at the exit to the harbor and can be pointed in the direction of the opposite pier head. This produces an electromagnetic "curtain" between the pier heads at the entrance to the harbor. When it passes through the stationary electromagnetic sector, the T/R unit in the craft is prompted to send the identification signal to the stationary T/R unit.

The process of the invention will be described in greater detail below with some preferred embodiments, using the drawings, which show a yacht harbor as the spatially limited protected area.

Figure 1:
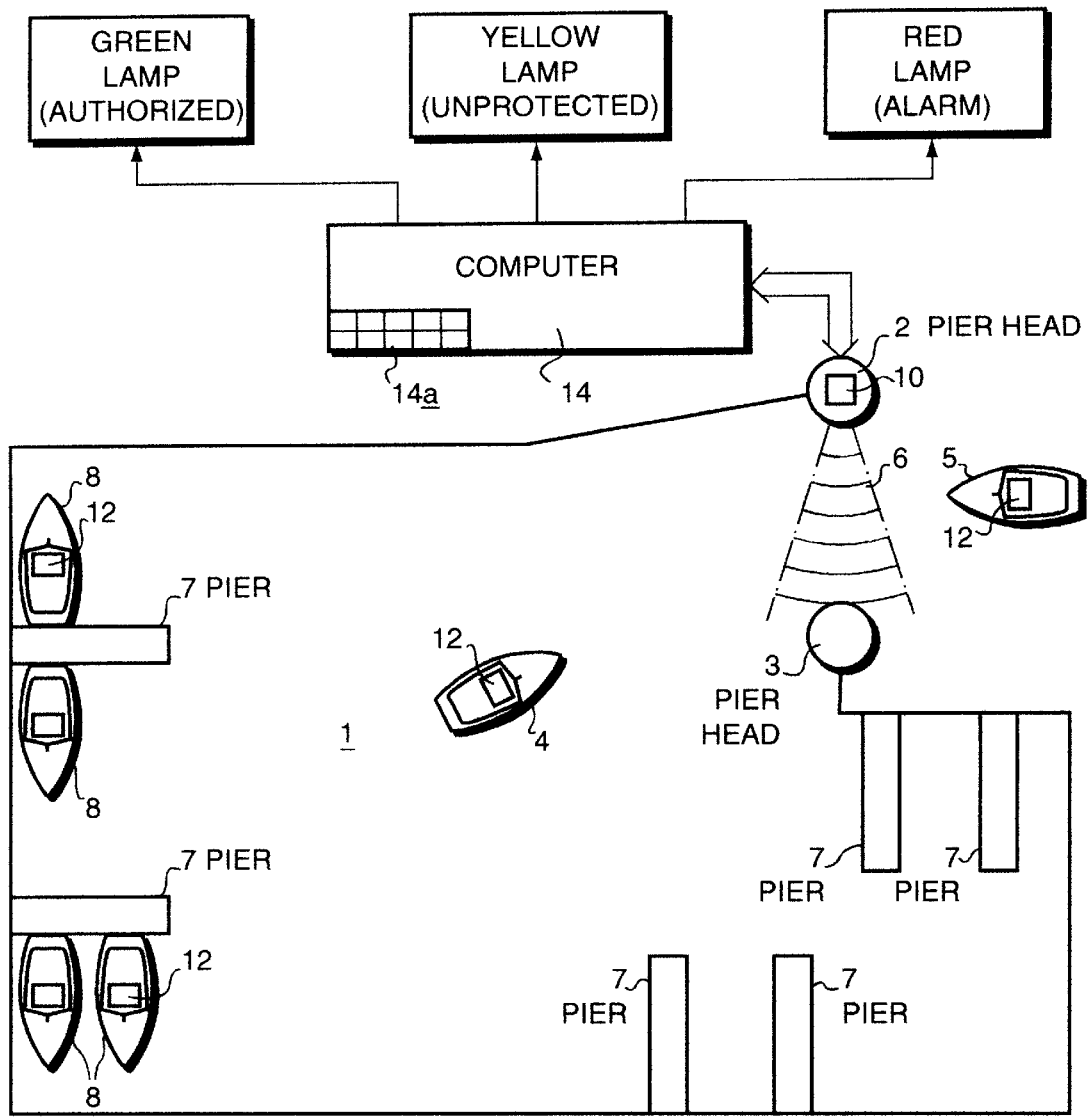
FIG. 1 shows a yacht harbor 1 (also called a marina) with a series of piers 7 and sailboats 8 attached to the piers.
Figure 2:
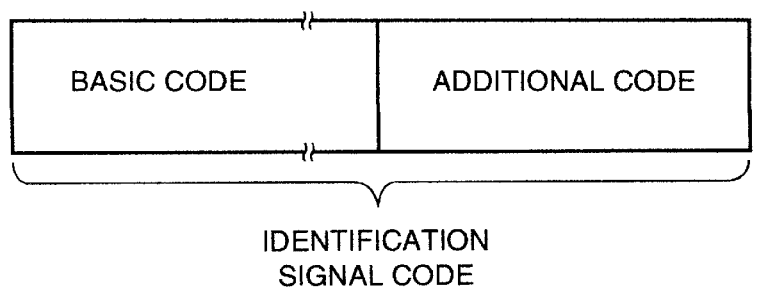
FIG. 2 is a block diagram of the identification signal code.
Figure 3:
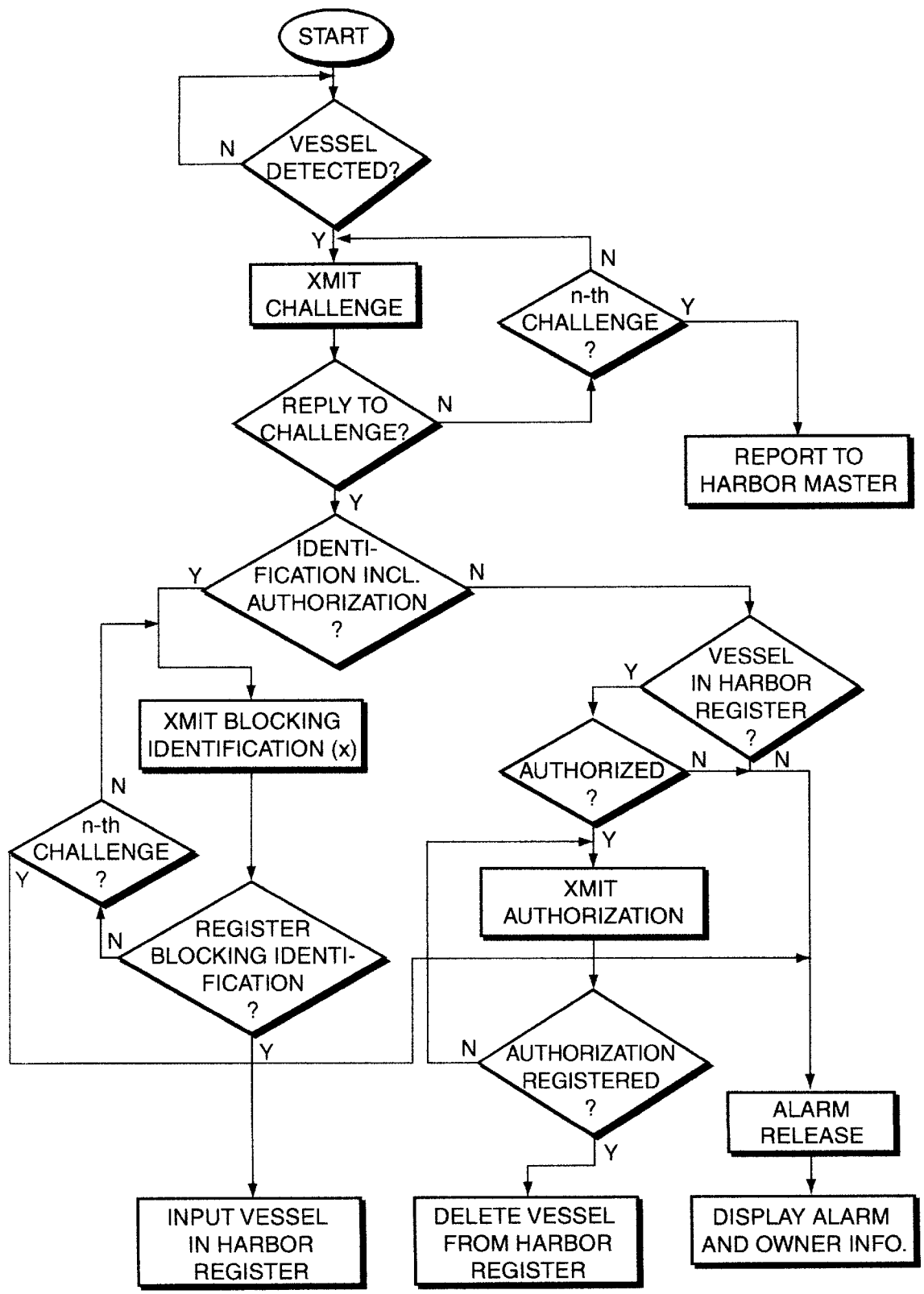
FIG. 3 is a flow chart illustrating the steps in the process according to the invention, The yacht harbor has an entrance and exit defined by two pier heads 2, 3. A stationary transmitter and receiver unit 10 (hereinafter briefly t/r unit) is disposed on the pier head 2 and emits an electromagnetic permanent signal 6 to the opposite pier head 3. Each vessel 4, 5, 8 to be protected is equipped with a t/r unit 12 of its own which, when querried, emits an identification signal comprising a basic code or basic answerback which identifies the vessel and a variable additional code or supplemental characteristic which identifies the legitimate or illegitimate use of the vessel. A central computer 14 is connected to the stationary t/r unit 10 on the harbor pier 2, storing the identification signals of all the watercraft 4, 8 tied at a piers 7 or moored inside the harbor. The central computer is informed by the ship-owner or an authorized person of permission to sail of one of the vessels 4, 8 inside the harbor by setting the supplemental characteristic of the memorized identification signal of the vessel to be authorized to a predetermined value, e.g. "0". This permission may be limited in time so that, for example, after 24 hours, value "0" of the supplemental characteristic authorizing the sailing is changed again to another value "X".

When a vessel 4, 5 moves into the sector 6, the on-board t/r unit is asked to emit the identification signal to the stationary t/r unit 10 on the pier head 2. Thereupon the central computer 14 compares the basic answerback of the identification signal received with the basic answerbacks stored to decide whether it is an incoming vessel 5 or an outgoing vessel 4. In view of the fact that the basic answerbacks of all the protected vessels inside the harbor 1 are known to the central computer, it is an outgoing vessel 4 if the basic answerback received is known to the central computer, and it is an incoming vessel 5 if the basic answerback of the identification signal received is not known to the central computer. In the case of an unknown basic answerback (inbound vessel) the central computer stores the identification signal (basic answerback+ supplemental characteristic) until departure. If the idenfication signal of the incoming vessel includes the supplemental characteristic "X", i. e. not the predetermined authorizing value "X" agreed upon for the entire procedure, it releases a warning and information program by which the data of the ship entering without authorization, the shipowner's personal data, as well as the time and place of the unauthorized entry appear on a screen of a supervisory organization, for example in the port office. Alternatively or in addition, the data displayed on the screen may be forwarded by telefax from the central computer directly to the shipowner.

The central computer may be informed of the release of the vessel for sailing either by way of an input keyboard 14a in the harbor, located for example in the port office, or by way of a telephone line operating according to the sound selection procedure. In both cases, it is required for authorization of the releasing person that a secret number fundamentally known only to the shipowner be input into the system, whereupon the supplemental characteristic of the vessel in question is set to the predetermined value "X" in the central computer 14. Further safety is obtainable by entry of the basic answerback of the vessel to be released after input of the secret number.

If the basic answerback is known to the central computer 14 upon receipt of an identification signal (outgoing vessel) the central computer reacts by the following operational sequence:

1. If the basic answerback of the identification signal received was cleared for sailing ("0" is stored in the central computer 14 as the supplemental characteristic) the stationary t/r unit 10 on harbor pier 2 transmits the basic answerback received together with the authorized supplemental characteristic "X" back to the outbound vessel 4. The identification signal thus composed will then remain stored in the on-board t/r unit 12 on vessel 4.

2. If the basic answerback of the identification signal received was not cleared for sailing (in this event the supplemental characteristic "X" is stored in the central computer for this basic answerback) the stationary t/r unit 10 of the harbor pier 2 transmits back the identification signal with the basic answerback and the supplemental characteristic "X" and releases the warning and information program. The identification signal so composed again is memorized in the on-board t/r unit 12 on vessel 4.

The return transmission of the identification signal by the stationary t/r unit, therefore, has the consequence that the outbound vessel 4 is given an accompanying supplemental characteristic, invisible to the sailor, which makes the vessel identifiable as being used with or without authorization. Duly entitled or public authorities, like the police or coast guard, etc., have portable scanning equipment at their disposal to extract the supplemental characteristic of a vessel. The desired information can be displayed on the inquiry device in simple manner and very clearly by means of three light emitting diodes or the like: for example, if a yellow LED lights up, it is not a vessel which is protected according to the method; if the green LED is illuminated, it is a case of authorized use of the vessel; and if a red LED lights up, the use of the vessel is not authorized.

To release a vessel by means of the input described of a secret number, followed, if desired, by the basic answerback of the vessel to be released, it is also possible, of course, for the shipowner or the authorized person to enter a time period of full hours at the input unit so as to fix for how long this sailing authorization is to remain stored in the central computer. This is advantageous especially in the renting of sailboats or motor yachts because then the owner is not bound to the actual sailing time at which he would then have to enter the release into the central computer. Preferably it is provided that the secret number is transmitted by the input unit to the central computer 14 in encoded fashion and that the coordination of the secret number with the corresponding basic answerback of the vessel to be released is not effected until after decoding of the secret number in the central computer itself in order to reduce the possibility of influencing the system according to the method as far as possible.

We claim:

1. A process to protect the ownership of watercraft that lie in a spatially limited area, said process comprising the steps of positioning a stationary transmitting/receiving unit near said area for interrogating craft entering and leaving said area;

positioning a mobile transmitting/receiving unit on board at least one craft in said area which, when interrogated by the stationary unit, transmits a coded identification signal for the corresponding craft whose code contains a basic code identifying the craft and an additional changeable code signifying authorized use of the corresponding craft;

connecting a central computer to the stationary unit to receive and store identification signal codes for all craft lying in said area;

comparing the code identification signal in the coded identification signal transmitted by said mobile unit with the identification signal codes stored in the computer and
1) when the stationary unit receives an identification signal code that is the same as an identification signal code stored in the computer, it sends back to the mobile unit, an additional code which corresponds to a first predetermined value, and
2) when the stationary unit receives an identification signal code that is not the same as any identification signal code stored in the computer, it sends back to the mobile unit, an additional code which corresponds to a second predetermined value, and storing in the mobile unit, the identification code sent back by the stationary unit.

2. The process defined in claim 1 and including the step of providing means in the central computer only for changing the additional code in the coded identification signal transmitted to said mobile unit.

3. The process according to claims 1 or 2 including the steps of comparing in the central computer, the basic code in the coded identification signal transmitted by said mobile unit with the basic codes stored in the computer, and triggering an alarm if the additional code in said coded identification signal does not correspond to said first predetermined value.

4. The process according to claim 1 or 2 including the step of storing in the computer an identification signal code received by the stationary unit from the mobile unit when the stationary unit receives an identification signal code whose basic code is not the same as any of the basic codes stored in the computer.

5. The process according to claim 1 or 2 including the additional step of arranging said stationary unit so that at least one sector of its electromagnetic radiation pattern extends along the border of said spatially limited area.

* * * * *